(12) United States Patent
Kemmler et al.

(10) Patent No.: US 9,172,787 B2
(45) Date of Patent: Oct. 27, 2015

(54) CELLULAR TELEPHONE DOCKING DEVICE AND SILENCING METHOD

(71) Applicants: Alexander B. Kemmler, Chicago, IL (US); Joseph Born, Lincolnwood, IL (US)

(72) Inventors: Alexander B. Kemmler, Chicago, IL (US); Joseph Born, Lincolnwood, IL (US)

(*) Notice: Subject to any disclaimer, the term of this patent is extended or adjusted under 35 U.S.C. 154(b) by 13 days.

(21) Appl. No.: 14/250,612

(22) Filed: Apr. 11, 2014

(65) Prior Publication Data

US 2014/0342775 A1 Nov. 20, 2014

Related U.S. Application Data

(60) Provisional application No. 61/810,957, filed on Apr. 11, 2013.

(51) Int. Cl.
*H04M 19/04* (2006.01)
*H04M 1/725* (2006.01)
*H04M 1/04* (2006.01)

(52) U.S. Cl.
CPC ............ *H04M 1/72569* (2013.01); *H04M 1/04* (2013.01); *H04M 19/045* (2013.01)

(58) Field of Classification Search
CPC .................................................. H04M 19/045
See application file for complete search history.

(56) References Cited

U.S. PATENT DOCUMENTS

| | | | | |
|---|---|---|---|---|
| 5,305,370 | A * | 4/1994 | Kearns et al. | 379/45 |
| 7,013,163 | B2 * | 3/2006 | Jaggers et al. | 455/557 |
| 7,634,296 | B2 * | 12/2009 | Haeusel | 455/557 |
| 2002/0072390 | A1 * | 6/2002 | Uchiyama | 455/557 |
| 2004/0067751 | A1 * | 4/2004 | Vandermeijden et al. | 455/414.1 |
| 2005/0143016 | A1 * | 6/2005 | Becker et al. | 455/74 |
| 2007/0247794 | A1 * | 10/2007 | Jaffe et al. | 361/681 |
| 2008/0266783 | A1 * | 10/2008 | Mills et al. | 361/686 |
| 2011/0098087 | A1 * | 4/2011 | Tseng | 455/557 |
| 2011/0244918 | A1 * | 10/2011 | Kavounas | 455/556.1 |
| 2012/0046074 | A1 * | 2/2012 | Gittleman et al. | 455/557 |
| 2012/0302288 | A1 * | 11/2012 | Born et al. | 455/557 |

* cited by examiner

*Primary Examiner* — David Bilodeau
(74) *Attorney, Agent, or Firm* — Clifford H. Kraft

(57) ABSTRACT

A system for, and method of intelligently silencing a mobile telephone, allowing the user to avoid unnecessary interruptions while sleeping or engaged in other activities and while still allowing necessary or urgent notifications to be received. The invention provides a method for creating a "do not disturb" mode on a mobile phone, which provides an explicit mechanism which can allow certain designated callers to override the "do not disturb" mode. When the phone is in "do not disturb" mode, an option is typically provided which allows the phone owner to designate certain contacts for different treatment upon receipt of a call or message.

10 Claims, 4 Drawing Sheets

CELLULAR TELEPHONE DOCKING DEVICE AND SILENCING METHOD

This application is related to and claims priority from U.S. Provisional Patent Application No. 61/810,957 filed Apr. 11, 2013. Application 61/810,957 is hereby incorporated by reference in its entirety.

BACKGROUND

1. Field of the Invention

The present invention relates generally to electronic equipment docks and more particularly to a method for silencing a phone using a docking unit that can dock a wide variety of cellular telephones.

2. Description of the Prior Art

Portable devices, speakers and docks for portable electronic equipment such as digital media and audio players, including so-called MP-3 players, are known in art and have been very popular with consumers. Such devices have ranged dramatically in price, quality and functionality. The simplest have been battery or wall-powered speakers connected to the portable player solely by a 3.5 mm stereo headphone jack. Recently, more advanced devices have come into the market with proprietary connectors that allow charging and control of the device as well as providing speakers. Some of these devices have had remote controls.

The demand for devices has continued to increase with the proliferation of digital and portable media applications and services that have been incorporated into cellular telephones, particularly a new type of so-called "smartphones" that offer computer-like power and functionality. The capability of these devices has increased to include a variety of new applications and services including, but not limited to, streaming music and media services, which operate to provide online radio, on-demand and streaming music and recommendation services as well as on-demand and streaming video, TV and movie entertainment. One common application for such phones is as a replacement for an alarm clock.

It would be particularly advantageous to have a universal docking device that would allow a simplified means for silencing the phone in a way that still allows urgent notifications to get through.

It would be advantageous to have a dock that also provides visual notifications that allow users to see, at a glance, which non urgent notifications have been received.

It would be advantageous if such silencing schemes were easily customizable by the user based on their personal preferences.

Prior art docks generally have lacked integration with phones that allowed silencing the phones as well as providing visual notifications.

While other "do not disturb" features exist in the prior art smartphones, they suffer from the following shortcomings: In one case, they require triggering by setting a daily time to go into "do not disturb mode" of course, this does not allow for changes in daily schedules, nor does it allow for unanticipated periods where the user may desire that their phones go into such a mode, such as taking a nap, attending a meeting or undertaking an activity that requires uninterrupted concentration. In another case, it may require manually initiating the mode, which has two problems, first, it requires navigating through phone menus and interfaces, which is often time consuming. Second, it requires the user to remember to do go through that same process to end the "do not disturb" period, the failure to do so means that the user will miss calls and notifications after the intended "do not disturb" period has ended. Furthermore, it is often the case, that a user desires a way to have some feel for what notifications have been missed while the phone is silenced. In other words, something that allows them to see at a glance the status of missed notifications without actually being interrupted by them. Finally, the prior art offers users the ability to designate a certain list of callers who's calls will always ring the phone, even when in "do not disturb" mode. However, this method is inadequate to discriminate between urgent and non urgent calls since it's often the case that any given caller will call or send messages that vary in level of urgency. A second method that has been employed is to allow repeat calls made in close sequence to override the "do not disturb" mode. For example, if a caller calls twice within 3 minutes, the phone will ring. Calling repeatedly in close sequence is often a proxy for the urgency of the message, but not always. Furthermore, not all callers will anticipate that calling a second time will initiate this special function, and without this knowledge, they may be loathe to call repeatedly on the presumption that the unanswered first call was an indication that the recipient was unable to receive the call, and a second call would provide no additional useful function.

SUMMARY OF THE INVENTION

The present invention relates to a system for, and method of intelligently silencing a mobile telephone, allowing the user to avoid unnecessary interruptions while sleeping or engaged in other activities and while still allowing necessary or urgent notifications to be received. The invention provides a method for creating a "do not disturb" mode on a mobile phone, which provides an explicit mechanism which can allow certain designated callers to override the "do not disturb" mode. When the phone is in "do not disturb" mode, an option is typically provided which allows the phone owner to designate certain contacts for different treatment upon receipt of a call or message.

In a particular embodiment of the present invention, a docking device is provided which can provide buttons, and optionally lights, which can facilitate the use of a mobile phone, particularly when the phone is being used near where the user is sleeping or otherwise engaged in activities where audible phone rings or notifications would be disruptive. In some embodiments, such a dock would also provide additional functions such as charging and one or more amplified speakers. The dock can optionally have a button designated to initiate and terminate the "do not disturb" mode. Removal of the phone from the dock can automatically cause the phone to exit from "do not disturb" mode and resume normal operation. This removes the need for users to explicitly exit the "do not disturb" mode and prevents users from inadvertently leaving the phone in that mode.

DESCRIPTION OF THE FIGURES

Attention is now drawn to several drawings that illustrate features of the present invention.

Figure 1:
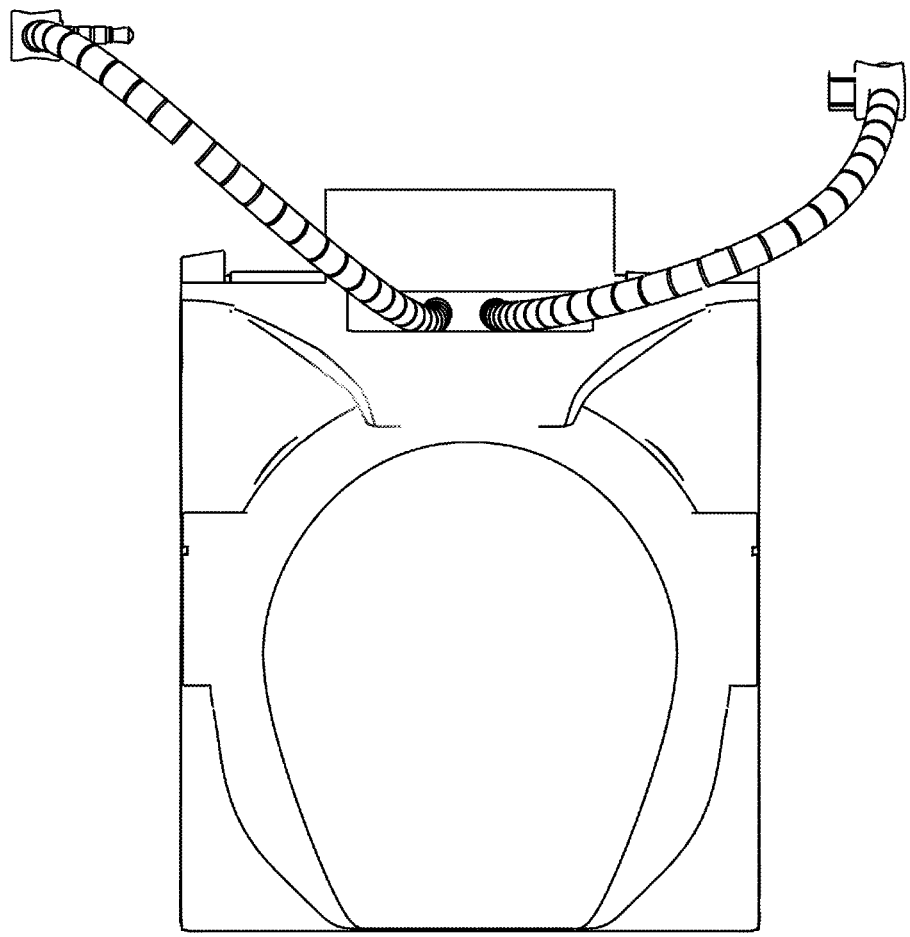
FIG. 1 shows a back view of an embodiment of a dock according to the present invention.

While several drawings and illustrations have been presented to aid in understanding the present invention, the scope of the present invention is not limited to what is shown in the figures.

DETAILED DESCRIPTION OF THE INVENTION

The present invention relates to a system and method for intelligently silencing a mobile telephone allowing the user to avoid unnecessary interruptions while sleeping or engaged in other activities and while still allowing necessary or urgent notifications to be received.

This invention provides a method for creating a "do not disturb" mode on a mobile phone, which provides an explicit mechanism which can allow certain designated callers to override the "do not disturb" mode. In the current invention when the phone is in "do not disturb" mode, an option is provided which allows the phone owner to designate certain contacts for different treatment upon receipt of a call or message. It is anticipated that contacts will be categorized by the phone owner into three groups. The three groups can be named "always ring," "silence," and "notify." As would be expected, the callers in the "always ring" group will ring regardless of if "do not disturb" mode is initiated. The callers in the "silence" group will simply have their calls and messages silenced when the phone is in "do not disturb" mode. The callers in the "notify" will have their calls and messages silenced, however, this group will be treated differently from the "silence" group in that they will be sent a message, notifying them with a customized message from the phone owner, prompting them to respond if they wish an urgent call or message to get through. In those cases where it is possible to integrate the feature with an existing voice mail system, it may be possible to simply prompt the "notify" users that you have put your phone in "do not disturb" mode and to ask them if they would like to override. This may be also be possible using a separate answering application or service that would receive incoming calls when the phone is docked to provide specific prompts offering to certain callers the option of ringing the phone or dock despite it being in "do not disturb" mode.

If it is not possible, or desirable, to integrate the feature into an existing voice mail system, or to create an additional voice answering system, it may be possible to send a notification to the user separately. Such a notification could take the form of an email, text message or automated return voice call, where the phone would call the user back and using a pre-recorded message, notify the caller of the option to override the "do not disturb" mode. It is anticipated that different modes may be used depending on the nature of the initiating call. For example, it would be natural to respond to a text message with a text message. A call from a landline phone however, would not allow responding via text message and thus either a return automated call or an email send to an email address associated with that caller could be used.

One method of querying and accepting a response from a user would be to send a message via text "My phone is in 'do not disturb' mode. If this is an emergency, please reply to this text with the word "emergency" and I will be immediately alerted." Then upon receipt of such message, the recipient would be alerted by the phone ringing, or by some other means as configured by the user. It should be appreciated that such a method would not be limited to text, phone or email, but could be extended to other messaging services such as instant messenger, chat, and social media messaging services as well.

The designation of contacts into multiple groups may be explicit or it may be done by default, depending on the detailed implementation of the feature. For example, each contact may be designated into one of the three groups explicitly or such designation may be done by other groups the user has created. In addition, the app will allow configuration that designates the default behavior for those contacts not explicitly categorized, ie non-categorized contacts may be designated as "silence" "always ring" or "prompt."

In an embodiment of this invention, a docking device is provided which can provide buttons, and optionally lights, which can facilitate the use of a mobile phone, particularly when the phone is being used near where the user is sleeping or otherwise engaged in activities where audible phone rings or notifications would be disruptive. In some embodiments, such a dock would also provide additional functions such as charging and one or more amplified speakers. It would be desirable that the invention have a button designated to initiate and terminate the "do not disturb" mode. It would also be desirable that removal of the phone from the dock would automatically cause the phone to exit from "do not disturb" mode and resume normal operation. This would remove the need for users to explicitly exit the "do not disturb" mode and would prevent users from inadvertently leaving the phone in that mode.

It should be appreciated that other means for automatically exiting the phone from "do not disturb" mode could also be used, which would not require the use of a dedicated dock. Exiting the alarm clock interface could automatically exit the phone from "do not disturb mode." Although this would require manual interaction with the phone, it would still eliminate the steps of manually resetting the phone to normal operation from muted, and would typically not add an additional step as the user typically exits the alarm clock mode at the time they wish their phone to ring normally. Unplugging the phone from the wall is another possible means for exiting from "do not disturb" mode as unplugging the phone from the wall is associated with a transition from being in a mode where the "do not disturb" mode was initiated. Finally, the use of accelerometers embedded into the phone or even gps sensors to determine that the user has moved a designated distance from the location where "do not disturb" was initiated could provide a signal that this mode should be exited.

There may be cases where the user wishes to have notifications available to them at a glance without being interrupted by them. Another aspect of this invention is that while it silences notifications, it allows the user information about them by illuminating a light on the dock, or series of lights to designate their occurrence. For example the receipt of a text message could be designated by the blinking of a red light on the dock. As the number of received text messages increase, the frequency of the blinking light could increase. Similarly, different colored lights could designate the receipt of voice calls or messages, email messages or messages from social networking services. Such lights could be light emitting diodes, In one embodiment, a multicolored light emitting diode or multiple light emitting diodes could be connected to a single bulb or light pipe thus to illuminate a single area with light, blinking at various frequencies in various colors to designate the receipt of various notifications. The connection to the notification device may be proximate, via wired or inductive connection thus also allowing charging of the mobile phone. The connection to the device could also be wireless allowing notification on devices that are not proximate to the phone, such as over BLUETOOTH or WiFi.

In another embodiment each designation would have its own specially labeled bulb or lightguides creating an illuminated area powered by a single colored light emitting diode. In such a case, multiple areas could be arrayed on a dock, each labeled with the type of notification they are meant to designate, such as "email" "voicemail" "text" "facebook" etc. In a further embodiment, each such illuminated areas could also be a button, wherein the user could press each button to bring up the application displaying further information about the notifications, such as the sender of the voicemail or the text message.

In some embodiments, it may be desirable that the application managing the configuration of the dock provide an option that the phone not become locked while docked in the dock of this invention as it would facilitate the receipt of information more easily if the user did not have to provide unlocking information, such as a pin number or gesture, in order to quickly view information. Since the motivation for such unlocking security is often to protect the phone's information in the case that a phone is lost or stolen phone, such precautions may often not be necessary in the safety of a location such as a home where such a dock is often used.

In other embodiments, the phone display itself could be used to designate the various notifications through the use of icons visible on the "alarm clock" mode display. There are numerous cases where a user may wish to receive notification at a glance of alerts but where audible notifications are not desirable. Such cases include when a partner sharing the bedroom has gone to sleep but the phone user continues to stay up to read, etc. While such on screen notifications are well known in the art, notifications specifically tailored to automatically providing information at a glance about missed notifications on the alarm clock screen, could allow users to turn off audible notifications without fear of missing important messages or groups of messages. Such automatic notifications presented directly on the alarm clock home screen would be particularly helpful in cases where seeing information at a glance and without requiring interactivity is important.

An API (application programming interface) can also be supplied to run on the telephone to allow user application developers to interface a wide range of docking and control functions to their particular user Apps (applications). The API provides a command set with commands that can control a generalized dock, with or without an alarm clock and other features, and also monitor its status. Typically a background application that runs on the phone but is primarily (or exclusively) intended to be used by other applications rather than directly by users, can be provided on the telephone. Such a background application directly interfaces the data channel between the telephone and the dock to allow seamless access to the dock by the API and hence user Apps. A user library can be supplied as well. In either case, the developer is provided access to button press information as well as the ability to illuminate the various lights that the dock provides.

A handheld remote can optionally be used with the generalized dock to also provide remote control functions. It some cases it may be desirable that the remote control contain a snooze button or other alarm clock functions such as "disable alarm" which allow operation from across the bed.

Figure 2:
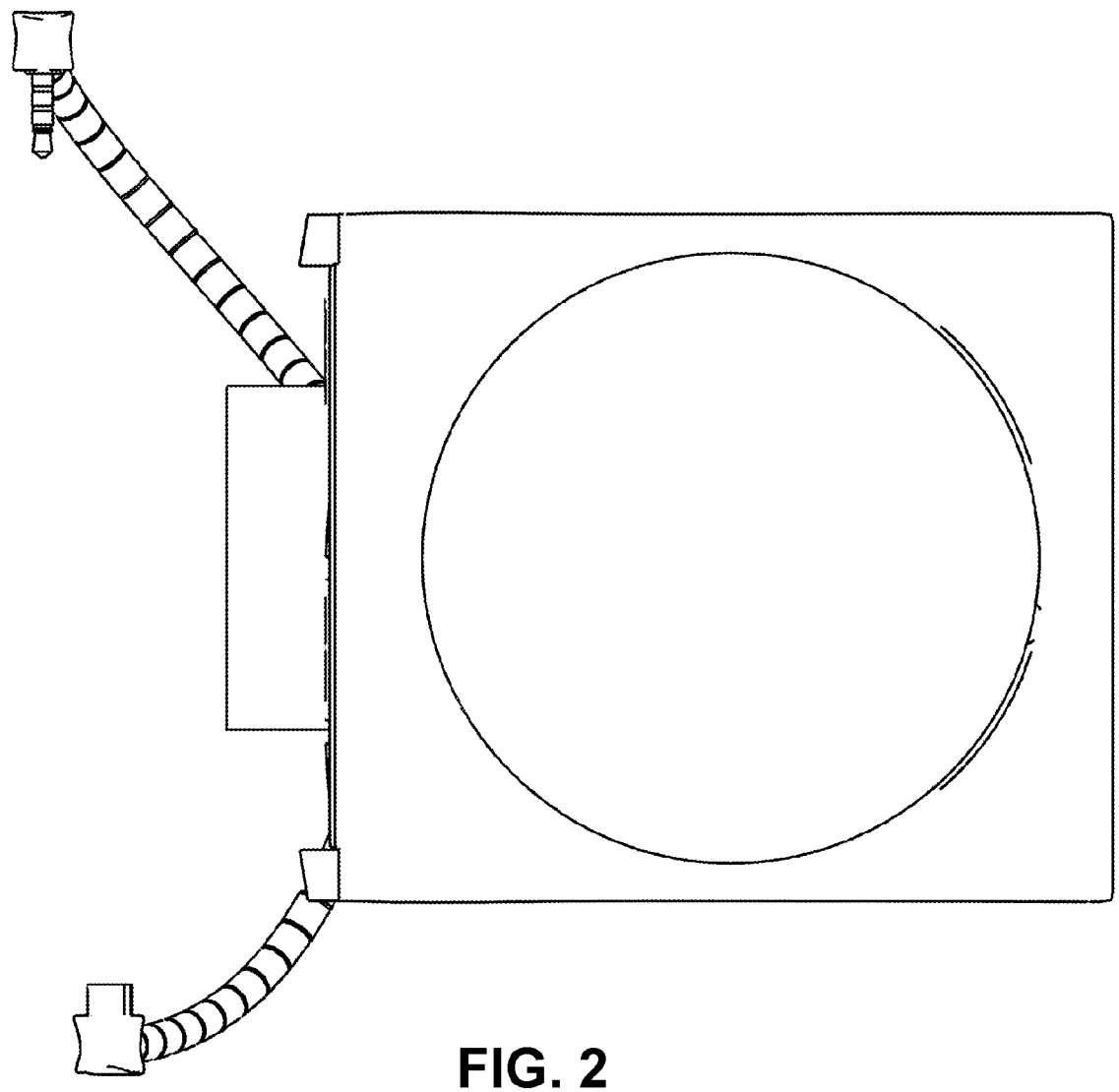
FIG. 2 shows a front view of the embodiment of FIG. 1 turned on its side.
Figure 3:
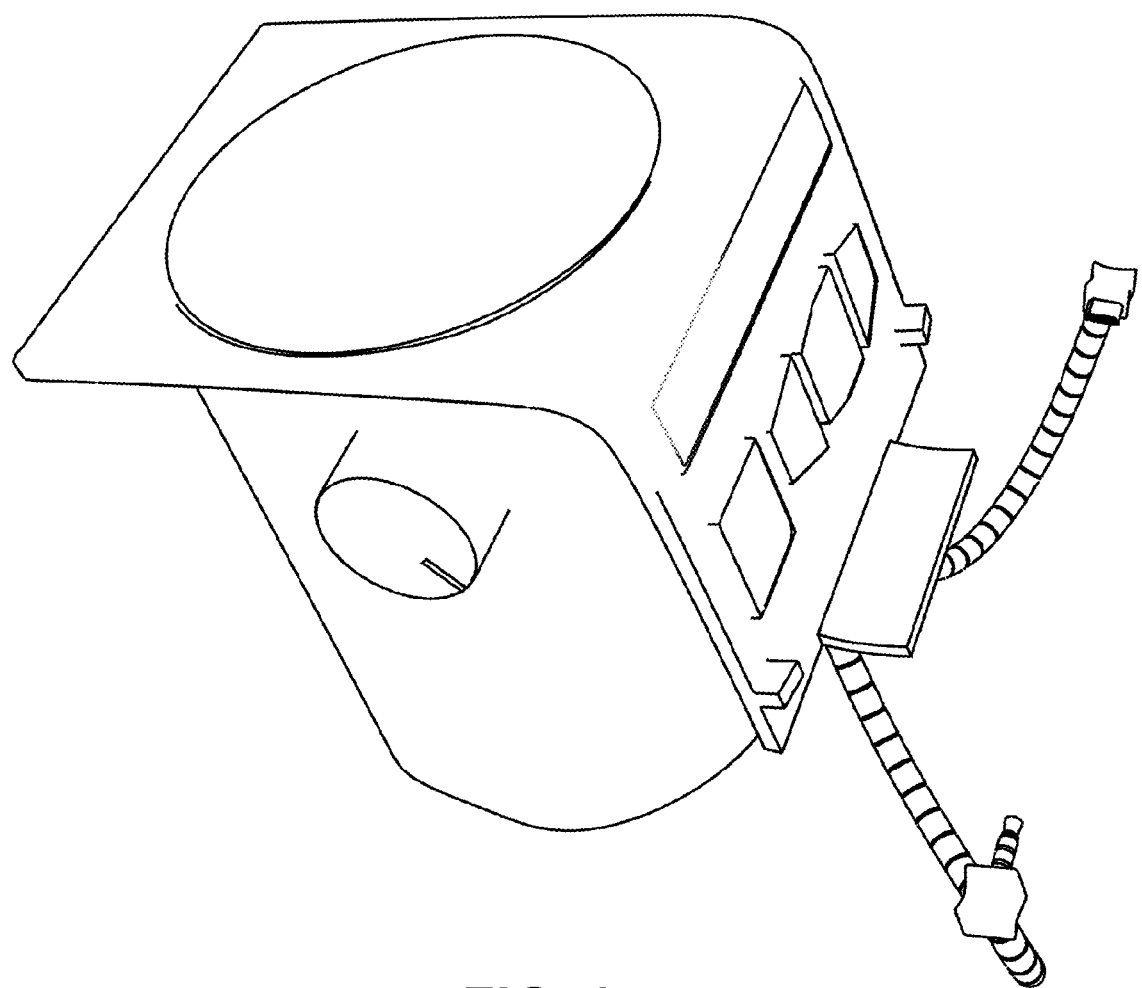
FIG. 3 shows an orthogonal view (but its on it's side)
Figure 4:
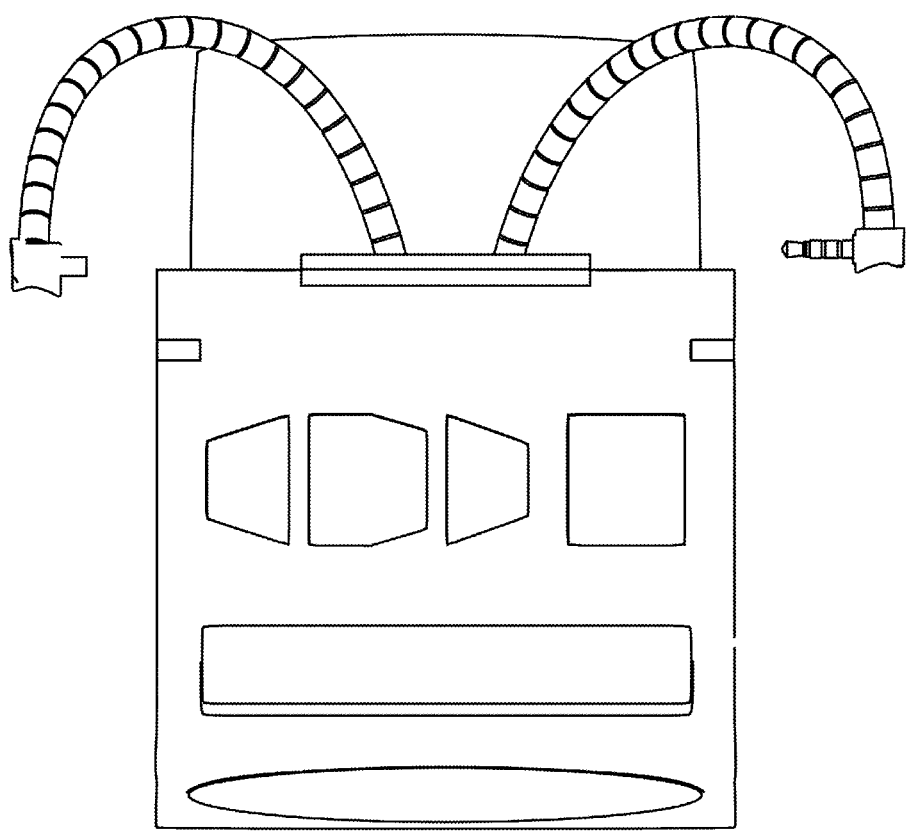
FIG. 4 shows a top view

FIGS. 1-4 show various views of embodiments of the present invention.

Several descriptions and illustrations have been presented to aid in understanding the present invention. One with skill in the art will realize that numerous changes and variations may be made without departing from the spirit of the invention. Each of these changes and variations are within the scope of the present invention

We claim:

1. A mobile telephone dock system comprising:
   a dock unit adapted to physically receive and hold a mobile telephone, said dock unit providing charging current to the mobile telephone and a data communications path between the dock unit and the mobile telephone;
   a control button on the dock unit which enables and disables a silence mode;
   a monitoring application adapted to be stored and to execute on the mobile telephone which automatically disables silence mode when the telephone is removed from the dock, and which allows a predetermined set of callers to override the silence mode.

2. The system of claim 1 further including an off button which overrides all overrides.

3. The system of claim 2 wherein the off button is the lowest setting of a volume knob.

4. The system of claim 1 wherein silenced notifications are represented by lights on the dock unit.

5. The system of claim 4 where multiple lights on dock are dedicated to distinct notifications.

6. The system of claim 1 wherein in said predetermined set of callers includes a plurality of separate groups.

7. The system of claim 6 wherein there are three separate groups: always ring, silence, and notify.

8. The system of claim 7 wherein callers in the notify group are given a custom voice mail or email message.

9. A mobile telephone dock system comprising: a dock unit adapted to physically receive and hold a mobile telephone, said dock unit providing charging current to the mobile telephone and a data communications path between the dock unit and the mobile telephone;
   a control button on the dock unit which enables and disables a silence mode; a monitoring application adapted to be stored and to execute on the mobile telephone which automatically disables silence mode when the telephone is removed from the dock, and which allows a predetermined set of callers to override the silence mode;
   an application programming interface (API) also stored and executable on the mobile telephone configured to allow user application developers to interface docking and control functions of the dock unit to their particular user applications.

10. The mobile telephone dock system of claim 9 further comprising a handheld remote control unit configured for wireless communication with the dock unit allowing remote control of docking and control functions.

* * * * *